Patented Apr. 21, 1942

2,280,722

UNITED STATES PATENT OFFICE 2,280,722

COLOR PHOTOGRAPHY

Wilhelm Schneider and Alfred Frölich, Dessau, Germany

No Drawing. Application July 13, 1939, Serial No. 284,250. In Germany July 14, 1938

3 Claims. (Cl. 95—6)

This invention relates to color photography and more particularly to dyestuff components for color forming development.

It has been proposed to use in the production of photographic color pictures silver halide emulsions with color formers fast to diffusion which are added in dissolved form to the silver halide emulsion but are not capable of being washed out of the emulsion. Such color formers fast to diffusion are obtained from simple dyestuff components by introducing into them substituents which hinder diffusion. Among other substituents having this property it has been proposed to use carbon chains having more than 5 carbon atoms. Moreover, into these dyestuff components groups lending solubility in water, for instance sulphonic acid or carboxylic acid groups have been introduced in order to make the dyestuff component soluble in water, whereby its incorporation in the emulsion is facilitated and the crystallisation, for instance before or after the application of the emulsion, is prevented.

It is an object of the present invention to provide a method of producing novel dyestuff components for color forming development.

A further object resides in the provision of an improved emulsion for color forming development containing a novel and improved type of color former fast to diffusion.

A still further object is the provision of new color formers which are soluble in aqueous liquids but incapable of being removed from a silver halide emulsion by washing.

Still further objects will become apparent from the detailed specification following hereinafter.

This invention is based on the observation that color formers suitable for use in the production of color photographic pictures and fast to diffusion are obtained by introducing into the molecule of the color former one or more poly-membered substituents in which, apart from the initial and final members, the same arrangement of carbon atoms occurs several times, and these arrangements are connected by heteroatoms. By this kind of substitution the number of color formers suitable for color development is considerably increased. The invention consists in using poly-membered substituents corresponding with the general scheme (—A—X.)$_n$, where A is a carbon chain of, for example, 2-4 carbon atoms, for instance ethylene or a homologue thereof, X is a hetero-atom or -group, for instance oxygen, the imino group or sulphur. The individual members of the substituent therefore consist, for example, of ethylene- or propylene radicals or similar hydrocarbon groups which are united to form a poly-membered substituent by a hetero-atom, for instance oxygen, nitrogen or sulphur, the initial member carrying a reactive group which makes it possible to unite the substituent which the molecule of the dyestuff former and the final group being a hydrogen atom or any desired carbon group. Such substituents are, for example, the poly-merides of ethylene oxide, propylene oxide, ethylethylene oxide, diamethylethylene oxide, trimethylethylene oxide, oxypropylene oxide, hexylene oxide, methylpropylene oxide, isopropylethylene oxide, butylene dioxide, erythrene dioxide and other ethylene oxides containing alkyl or cycloalkyl or aryl or aralkyl radicals, as well as the halogen derivatives of these, for example epichlorhydrin, dichloropropylene oxide, epibromhydrin, β-bromethylene oxide, alkylene imines and alkylene sulphides, for example ethylene imine and ethylene sulphide, also phenoxypropene oxide, alkyl-polyethoxyacetic acids, polyethylene oxide carboxylic acids, aryl-polyethylene oxide acetic acids.

The number of the several members in these poly-membered substituents which is necessary to make the coupling component fast to diffusion is dependent on the molecular size of the several members. In the case of polyethylene oxide this fastness is generally attained by a chain having about 5 to 6 structural units $$-(CH_2-CH_2-O)-$$

As color formers such compounds come into question as are suitable in the color development for forming quinoneimine or azomethine dyestuffs, for example phenols, naphthols, aminonaphthols, anilines, naphthylamines. Of these components phenols and naphthols are foremost which in the para-position, to the hydroxyl group contain no substituent or a negative substituent, the latter being eliminated during the development, for example resorcinol, meta-aminophenol, aminocresol, chloraminocresol, salicylic acid, 1-hydroxybenzene-2:6-dicarboxylic acid, meta-xylenol-carboxylic acid, 2-aminophenol-4-sulphonic acid, 2-amino-6-methoxyphenol, 1:3-dihydroxynaphthalene, 1:8-dihydroxynaphthalene, 1:2-aminonapththol, 1:5-aminonaphthol, 4-chloro-5-amino-α-naphthol, α-hydroxynaphthoic acid, 4-chloro-1-hydroxy-2-naphthoic acid, 6-amino-1-hydroxy-2-naphthoic acid, 6-methoxy-1-hydroxy-2-naphthoic acid, 2-amin-4-sulphonic acid-α-naphthol, 5-amino-4-sulphonic acid-α-naphthol, 5-hydroxytetrahydroquinoline, 2-hydroxy-4'-aminodiphenyl ether, 2-hydroxy-4-aminodiphenyl methane, 6-hydroxycinnamic acid, 4:4'-diamino-2:2'-dihydroxydiphenyl; also all bodies which have a reactive methylene group, for instance acetoacetic acid esters, cyanoacetic acid esters, benzoyl acetic acid esters, benzoyl acetonitrile, hydrindenes, pyrazolones, isoxazolones, cumaranones, hydroxythionaphthenes and others.

Furthermore, the substituents may be introduced into the color former such as those named in U. S. Patents Nos. 2,178,612; 2,186,849; 2,186,850; 2,179,244; 2,186,732; 2,156,821; 2,186,733; 2,186,851; 2,186,735; 2,186,734; 2,186,719; 2,186,852; 2,186,736; 2,200,306; 2,154,918; 2,186,045; 2,214,483; 2,186,685; 2,179,238 and U. S. P. application Serial No. 265,601, filed June 24, 1938.

The substituents which lend fastness to diffusion may be introduced directly into the molecule of the color former in various ways, for instance by the process described in German Patent 670,419. Typical reactions are as follows:

1-nitro-2-naphthol is condensed with ethylene oxide in such a manner that a polyethylene oxide chain of an average number of members at least 5 is formed whereupon the nitro-group is converted in known manner into the hydroxy-group, so that a 1-naphthol-2-polyethylene oxide ether is produced. During the condensation with ethylene oxide there are produced besides 5-membered polyethylene oxide chains both some longer and shorter chains. Preferably the reaction is conducted by using a suitable excess of ethylene oxide in such a manner that longer chains than those having 5-members or structural units may be produced, but none shorter. Should the reaction produce also shorter chains than are required to ensure the fastness of the dyestuff former to diffusion these compounds may be removed in simple manner by dissolving the color former in gelatine and washing the gelatine before it is added to the emulsion. Alternatively a color former may be added directly to the emulsion and the emulsion washed.

Into 1-nitronaphthylmethylamine ethyleneimine is introduced, so that at the secondary amino-group ethylene-imine radicles are attached to the extent of an average number of members at least 5. After conversion of the nitro-group into the hydroxy-group, 1-hydroxy-2-methylpolyethylene-imine-naphthylamine is obtained.

Ethylacetoacetate is condensed with metanitraniline, the nitro-group is reduced and the amino-group thus formed is caused to react with the acid chloride from butylhepta-ethoxy-acetic acid of the formula $$C_4H_9(OCH_2CH_2)_7-O-CH_2COOH$$

2-amino-1-naphthol is caused to react with the chloride of propylhepta-ethoxyacetic acid of the formula $C_3H_7(OCH_2CH_2)_7O-CH_2-COOH$.

The substituents which prevent diffusion may also be introduced at an intermediate stage, for example by causing meta-nitrophenol to react with ethylene oxide in such a manner that a polyethylene oxide ether having an average number of 5 structural units is produced, whereupon the nitro-group is reduced. The aminophenol ether thus obtained may be worked up in various ways to dyestuff components for color forming development, for instance by condensing it with α-hydroxynaphthoic acid chloride, thus obtaining a coupling component yielding a blue picture upon color forming development. Again the amino-phenol ether may be condensed with an acylacetic acid ester and in this manner a component which is fast to diffusion yielding a yellow dye upon color forming development is obtained. Further, a substituted pyrazolone may be made from the aminophenyl ether by way of the hydrazine; this is suitable as a coupling component for color forming development yielding a red dye.

Instead of the nitrophenylpolyethylene oxide ether, numerous other intermediate products may be used, for example a condensation product of ethylaniline and ethylene oxide which, by subsequent nitrosation and reduction acquires an amino-group suitable for the reaction. Analogously ethylaniline may be caused to react with propylene oxide, ethylene-imine and the like.

A further possibility in making components fast to diffusion by this invention consists in condensing meta-nitrophenol with ethylene oxide, propylene oxide, butylene dioxide, or another homologue, and converting the nitro-group in known manner into the hydroxy-group. In this manner coupling components for color forming development yielding blue dyes are obtained.

Chlorethanol is condensed with ethylene oxide or a homologue or analogue thereof in such a manner that for instance a polyethylene oxide chain with at least 8 structural units is obtained, and the chlorine is exchanged for an amino-group by treatment with ammonia to obtain a very valuable intermediate product for dyestuff components, for instance the amino-group may be condensed with a dyestuff component containing a carboxyl group, for instance α-hydroxynaphthoic acid; there is thus obtained a component fast to diffusion for color forming development yielding a blue picture dye. If ethyl benzoylacetate is similarly condensed, there is obtained a coupling component for yellow.

Instead of chlorethanol, chloroethylglycol may be used, and this condensed for example with butylene oxide. By the use of this already polymembered parent material, the formation of shorter chains is automatically diminished.

A further possibility consists in using halogenated bodies capable of polymerisation, for example epichlorhydrin. Thus, chlorethanol is condensed with epichlorhydrin in the presence of a suitable catalyst, for instance tin tetrachloride, such excess of epichlorhydrin being used that a polymeric chain of an average number of 8 members is obtained. The chlorine atoms in this chain are exchanged for amino-groups whereby the condensation with color formers containing carboxyl groups becomes possible.

Instead of chlorethanol in the preceding example, there may be used a compound which of itself makes the color former fast to diffusion, in which case the condensation with epichlorhydrin, besides further increasing the fastness to diffusion, lends to the compound a valuable increase in solubility and renders possible the introduction of reactive groups. For instance, dodecylalcohol is condensed with 4 mols epichlorhydrin, the chlorine atoms are exchanged for amino-groups, and the product is condensed with α-hydroxynaphthoic acid chloride. There is obtained a coupling component for blue which is fast to diffusion. Instead of epichlorhydrin there may be used, for example, dichloropropylene oxide.

Furthermore, polyglycerols and polyglycols may be used for introducing the substituents. Dyestuff components can be introduced into these polymerisates by heating an acid, for example α-hydroxynaphthoic acid or salicylic acid, with the reaction. There are obtained in this manner soluble esters which when used as the dyestuff components in color forming development yield a blue dyestuff.

A special advantage of a large series of dyestuff formers produced by this invention consists in the enhanced water-solubility of the product without using special groups lending solubility thereto, for instance carboxyl groups or sulphogroups. The new color formers may for the most part be added directly in neutral solution to the silver halide emulsion.

The emulsion containing the color former fast to diffusion may be made up into photographic material in known manner, one or more layers of the emulsion being arranged on one or both sides of a carrier and superimposed if necessary. The layers may be used for producing black and white or color pictures. For color photography the several layers are preferably sensitised for different regions of the spectrum. If desired, several dyestuff components may be contained in one layer and these may be so selected that in the development a neutral grey picture is produced.

The emulsions may, however, be worked up in any other manner, for example differently sensitized emulsions containing different color formers may be distributed in the form of small particles on a carrier.

The color picture may be produced in various ways, for example as described in U. S. P. applications Ser. Nos. 10,704 filed March 12, 1935, 72,718 filed April 4, 1936, 94,340 filed August 5, 1936, 90,726, filed July 15, 1936, 141,093 filed May 6, 1937. In the exposed emulsion layer the picture may be developed by a simple color forming development or by reversal development as described in U. S. P. applications Ser. Nos. 148,731 filed June 17, 1937, and 100,319 filed September 11, 1936.

The following examples illustrate the invention:

*Example 1.*—1 nitro-2-naphthol is heated to 150° C. in an autoclave in toluene in the presence of some potassium hydroxide. Ethyleneoxide is introduced in gaseous form by means of nitrogen under pressure from a stock bottle, until the increase of weight of the autoclave indicates that the absorption of 5 ethyleneoxide radicals by 1 mol of nitronaphthol. After the end of reaction the toluene is removed in vacuo and the residue extracted several times with ether. The remaining solid is dissolved in glacial acetic acid and reduced catalytically. The amino-group obtained is diazotised and converted into the hydroxy-group by boiling in a hydroxylated solvent. 1 kilo of silver halide emulsion is mixed with a solution of 10 grams of this 2-pentaethoxy-1-naphthol. After casting the emulsion there is obtained a silver halide layer which, when developed with dimethylaminoanilin, yields a blue dyestuff picture.

*Example 2.*—Butylalcohol is condensed with ethylene-oxide and the product fractionated, in which case a partial decomposition in the hyvac cannot be avoided. The fractionation which by the determination of its molecular weight (Rast- and hydroxyl-number) has been found most suitable is reacted in benzene as a diluent in the form of the sodium-alcoholate with dodecylchloroacetic acid ester (from dodecylalcohol and chloroacetylchloride) to form butylheptaetheneoxy-acetic-acid-dodecylester. The latter is freed of some dodecylchloroacetic acid ester by shaking the solution in methanol or methanol/water with ligroin. By boiling with normal sodium hydroxide solution the ester is saponified. The dodecylalcohol which separates is removed by shaking with ether, the alkaline solution is rendered acid to "Congo" and evaporated until a dry residue remains. By extracting the residue with warm absolute alcohol and distilling of the solvent the butyl-heptaetheneoxy acetic acid,—a brown viscous fluid—is obtained.

Its conversion into the acid chloride is performed in the presence of an acid binding agent, f. i. pyridine in which case the complex compound of pyridine, acid, and thionylchloride need not be destroyed but can be used directly for acylating aminopyrazolone. 1 kilo of silver bromide emulsion is mixed with 10 grams of 1-phenyl-3:4'-butylhepta-etheneoxyaceto-aminophenyl-5-pyrazolone, and the emulsion is cast. There is obtained a silver halide layer which, on development with a developer for color forming development, yields a red dyestuff picture.

*Example 3.*—Ethylaniline is condensed with ethyleneimine in such a manner that the ethylene-imine forms a chain of an average number of 5 members; the product is nitrosated and reduced, and the reduction product condensed with ethyl acetoacetate. Of this condensation product 8 grams are added to 1 kilo of silver bromide emulsion and after casting the silver halide layer is exposed and treated with a color forming developer to produce a yellow dyestuff picture.

*Example 4.*—3-nitro-phenol is condensed with propylene oxide in such a manner that propylene oxide ether is produced having an average number of propenoxy groups of at least 5. After reduction of the nitro-group condensation with ethylbenzoylacetate follows. Of this condensation product 15 grams are added to 1 kilo of silver bromide emulsion. The silver halide emulsion yields on development with dimethylaminoaniline a yellow dyestuff picture.

*Example 5.*—2-amino-1-naphthol is condensed with the acid chloride of a polyetheneoxy-carboxylic acid which contains an average of about 7 ethylene oxide residues. Polyetheneoxy-carboxylic acids of this kind are produced by reacting the sodium salt of hydroxy acetic acid ester with ethylene oxide under pressure and subsequent saponification with dilute caustic soda lye.

Another method of producing the polyetheneoxycarboxylic acids consists in condensing chloroethyleneglycol in the presence of tin-tetrachloride with ethyleneoxide, the average number of ethyleneoxide molecules which have reacted being determined by the increase in weight of the reaction product. By reacting with a cyanide the halogen atom is substituted by the CN-radical, which can be saponified to yield the carboxylic acid radical. 15 grams of this product are added to 1 kilo of a silver halide emulsion. The latter is cast. The silver halide emulsion layer yields on color forming development a blue dyestuff picture.

*Example 6.*—Chlorethanol is condensed in presence of tin tetrachloride at about 150° C. with ethylene oxide in such a manner that an ethylene oxide chain of about 8 members is attached. (German Patent 670,419.) The product is treated with 30-fold excess of alcoholic ammonia or liquid ammonia and the amine thus obtained is condensed with α-hydroxynaphthoic acid chloride.

10 grams of this condensation product are added to 1 kilo of silver bromide emulsion which is then cast. The silver halide emulsion layer developed by color forming development yields a blue dyestuff picture.

*Example 7.*—The amino-product obtained as described in Example 6 is condensed in a methanol solution with ethylbenzoylacetate, and 15 grams of the product are added to 1 kilo of a silver bromide emulsion. Color forming development of the emulsion yields a yellow dyestuff picture.

*Example 8.*—1-nitro-3-chlorophenol is condensed with propylene oxide in presence of tin tetrachloride in such a manner that the phenolic methoxy-group is condensed with a chain of at least 6 propylene oxide residues. (German Patent No. 670,419.) The nitro-group is then reduced and the amino-group is condensed with α-hydroxynaphthoic acid.

Of this body 10 grams are added to 1 kilo of a silver bromide emulsion. The layer cast from the emulsion yields on color forming development a blue dyestuff picture. If the amino-product is condensed with ethylacetoacetate there is obtained a yellow coupling component. If the amino-group is converted in known manner into the hydrazine and condensed with ethylacetoacetate, there is obtained a pyrazolone. 10 grams of this pyrazolone are added to 1 kilo of silver halide emulsion, and the latter cast to yield a layer which on color forming development gives a red dyestuff picture.

*Example 9.*—5 grams of α-hydroxynaphthoic acid are heated with 20 grams of polyglycerol until no more water distils. The condensation product formed is stirred into 100 grams of a gelatine solution of 10 per cent strength; the gelatine solution is allowed to solidify and then washed for several hours and stirred into 300 cc. of silver halide emulsion. When this emulsion is cast and the layer is developed by color forming development, a blue dyestuff picture is obtained.

*Example 10.*—Polymeric ethylene oxide having a melting point of from 50–60° C. is reacted with α-hydroxynaphthoic acid chloride. The conversion product is purified by repeated extraction with ether. 10 g. of this product obtained by direct reaction of color former with polymeric ethylene oxide are added to 100 g. of gelatine solution of 10 per cent strength, whereafter the gelatine is washed shortly and stirred into 300 ccm. of silver halide emulsion. By casting this emulsion, layers are obtained which yield a blue dyestuff picture upon color forming development.

We claim:

1. An unexposed silver halide gelatine emulsion containing a color former which though soluble in aqueous liquids is fast to diffusion in gelatine, said component containing at least one substituent having a chain of the general formula $(-A-X-)_n$, wherein A is alkylene, X is a heterogroup selected from the class consisting of $-O-$, $-NR-$, and $-S-$, R being H, alkyl and $n$ is more than 5.

2. An unexposed silver halide gelatine emulsion containing a color former which though soluble in aqueous liquids is fast to diffusion in gelatine, said component containing at least one substituent consisting of a polyalkylen-oxide chain in which the alkylene oxide group recurs more than five times.

3. An unexposed silver halide gelatine emulsion containing a color former which though soluble in aqueous liquids is fast to diffusion in gelatine, said component containing at least one substituent consisting of a polyethylene oxide chain in which the structural unit $$-CH_2-CH_2-O-$$

recurs more than 5 times.

WILHELM SCHNEIDER.
ALFRED FRÖHLICH.